United States Patent
Dynak et al.

(10) Patent No.: US 11,708,770 B2
(45) Date of Patent: Jul. 25, 2023

(54) TURBINE CASING COMPONENT AND REPAIR METHOD THEREFOR

(71) Applicant: General Electric Company, Schenectady, NY (US)

(72) Inventors: Krzysztof Dynak, Warsaw (PL); Sharon Trombly Swede, Greenville, SC (US); Junyoung Park, Greenville, SC (US); Marek Miekus, Warsaw (PL); Tomasz Michal Szewczyk, Warsaw (PL); Robert Lebkowski, Warsaw (PL)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 17/594,369

(22) PCT Filed: Apr. 13, 2020

(86) PCT No.: PCT/US2020/027893
§ 371 (c)(1),
(2) Date: Oct. 13, 2021

(87) PCT Pub. No.: WO2020/214514
PCT Pub. Date: Oct. 22, 2020

(65) Prior Publication Data
US 2022/0220862 A1      Jul. 14, 2022

(30) Foreign Application Priority Data
Apr. 17, 2019   (EP) .................................. 19461528

(51) Int. Cl.
*F01D 25/00*   (2006.01)
*B23P 6/00*    (2006.01)
(Continued)

(52) U.S. Cl.
CPC ............ *F01D 25/005* (2013.01); *B23P 6/007* (2013.01); *F01D 11/08* (2013.01); *F01D 25/24* (2013.01);
(Continued)

(58) Field of Classification Search
CPC .......... F01D 11/08; F01D 25/24; F01D 5/005; B23P 6/007; B32B 15/01; B32B 15/013;
(Continued)

(56) References Cited

U.S. PATENT DOCUMENTS 4,609,577 A * 9/1986 Long ................... B23K 35/3086
                                                   428/685
4,817,859 A    4/1989 Breitenmoser et al.
(Continued)

FOREIGN PATENT DOCUMENTS

EP    0296861 A1    12/1988
EP    0715922 A1    6/1996
(Continued)

OTHER PUBLICATIONS

European Search Report from corresponding EP Application No. 19461528.2 dated Oct. 1, 2019, 8 pages.
(Continued)

*Primary Examiner* — Igor Kershteyn
(74) *Attorney, Agent, or Firm* — James Pemrick; Charlotte Wilson; Hoffman Warnick LLC

(57) ABSTRACT

A casing component is configured to form part of a flow path in a turbine. The casing component includes a base made of nodular cast iron, and a repaired region in the base. The repaired region includes a butter layer applied on the base and a fill layer applied on the butter layer.

11 Claims, 4 Drawing Sheets

(51) Int. Cl.
*F01D 11/08* (2006.01)
*F01D 25/24* (2006.01)

(52) U.S. Cl.
CPC ...... *F05D 2230/31* (2013.01); *F05D 2230/80* (2013.01); *F05D 2300/111* (2013.01); *F05D 2300/171* (2013.01)

(58) Field of Classification Search
CPC ..... C22C 37/04; C22C 19/03; B23K 35/3033; B23K 2101/001; F05D 2230/80; F05D 2230/31; F05D 2230/233; F05D 2300/111; F05D 2300/171; C21D 2251/00
See application file for complete search history.

(56) References Cited

U.S. PATENT DOCUMENTS

| | | | | |
|---|---|---|---|---|
| 4,897,519 | A * | 1/1990 | Clark | B23K 35/308 29/888.011 |
| 5,735,045 | A * | 4/1998 | Papayoti | F01D 25/285 29/402.06 |
| 6,860,718 | B2 * | 3/2005 | Suzuki | F01D 11/08 415/173.5 |
| 2004/0258192 | A1 * | 12/2004 | Angeliu | C23C 8/04 376/305 |
| 2008/0213091 | A1 * | 9/2008 | Lageder | F01D 25/26 415/209.3 |
| 2008/0230156 | A1 * | 9/2008 | Abriles | C22C 19/057 148/559 |
| 2009/0308847 | A1 * | 12/2009 | Kamimura | B23K 15/0086 219/76.1 |
| 2015/0224572 | A1 * | 8/2015 | Zhang | C22C 33/10 164/492 |
| 2016/0175991 | A1 * | 6/2016 | Kottilingam | B23K 35/304 219/121.45 |

FOREIGN PATENT DOCUMENTS

| | | |
|---|---|---|
| EP | 1844894 A1 | 10/2007 |
| EP | 2236236 A1 | 10/2010 |
| JP | 2006021206 A | 1/2006 |
| JP | 2007021530 A | 2/2007 |

OTHER PUBLICATIONS

International Search Report and Written Opinion from corresponding PCT Application No. PCT/US2020/027893 dated Jun. 17, 2020, 13 pages.
International Preliminary Report on Patentability from corresponding PCT Application No. PCT/US2020/027893 dated Oct. 28, 2021, 7 pages.

* cited by examiner

TURBINE CASING COMPONENT AND REPAIR METHOD THEREFOR

TECHNICAL FIELD

The present disclosure relates generally to turbine or turbomachine casing components and more specifically to the material composition, construction and repair methods therefor.

BACKGROUND

Nodular cast iron, such as ductile cast iron grade GGG40 (DIN), is a common material used to manufacture casings of turbines used in power generation. Casings are usually large and cast in non-serial production. This often leads to casting defects, as the process is not fully optimized. Furthermore, the casting can be damaged during machining due to damaged cutting tools or incorrect process settings.

Turbine casings are exposed to high mechanical loads during operation. Vibrations can lead to material fatigue and thus to the formation of cracks. Thermal stresses occur during start and stop sequences of the gas turbine. These temperature fluctuations and the concomitant expansion and contraction of the housing/casing can contribute to the formation of cracks and promotes the spread of existing cracks. If the cracks exceed design limits, the casings may be scrapped and new casings are required, which leads to high cost not only due to the manufacturing cost but also due to the delay in starting operation of the turbine. If possible, the defective castings are repaired mechanically and less often by welding due to the difficulty in the process. The welds often crack during the welding process, upon cooling or shortly during service time.

Two typical methods exist for welding cast iron referred as cold and hot welding. Hot welding comprises of depositing nodular cast iron material in the defective area. This process requires high preheat, 594° C. (1,100° F.) or higher, that may lead to deformation of the casing. For that reason, hot welding cannot be performed on finish machined parts. Cold welding involves using welding wire or electrode made of Ni, Ni—Fe or Ni—Fe—Mn alloy. The Ni alloy usually have lower strength than nodular cast iron. Ni—Fe and Ni—Fe—Mn alloys match the strength of nodular cast iron but those alloys have very low coefficient of thermal expansion (CTE). It makes the welding easier, however in large repairs will likely lead to failure during thermal cycling of the casing due to the increased stresses from the CTE mismatch.

BRIEF DESCRIPTION

Provided is a formulation of and a manufacturing method for a nodular cast iron casing and repair method therefor.

According to one aspect, a casing component is part of a gas or steam turbine. The casing component includes a base made of nodular cast iron, and a repaired region in the base. The repaired region includes a butter layer applied on the base and a filling layer applied on the butter layer.

According to another aspect, a method for repairing a casing component that is part of a gas or steam turbine is provided. The method includes a step for applying a butter layer on a base material. The butter layer is applied with a first interpass temperature. A second step applies a fill layer on the butter layer, and the fill layer is applied with a second interpass temperature. The first interpass temperature is lower than the second interpass temperature.

Other aspects and advantages of the present disclosure will become apparent from the following description, taken in connection with the accompanying drawings which by way of example illustrate exemplary aspects or embodiments of the present invention.

BRIEF DESCRIPTION OF THE DRAWINGS

By way of example, embodiments of the present disclosure are described more fully hereinafter with reference to the accompanying drawings, in which.

DETAILED DESCRIPTION

Figure 1:
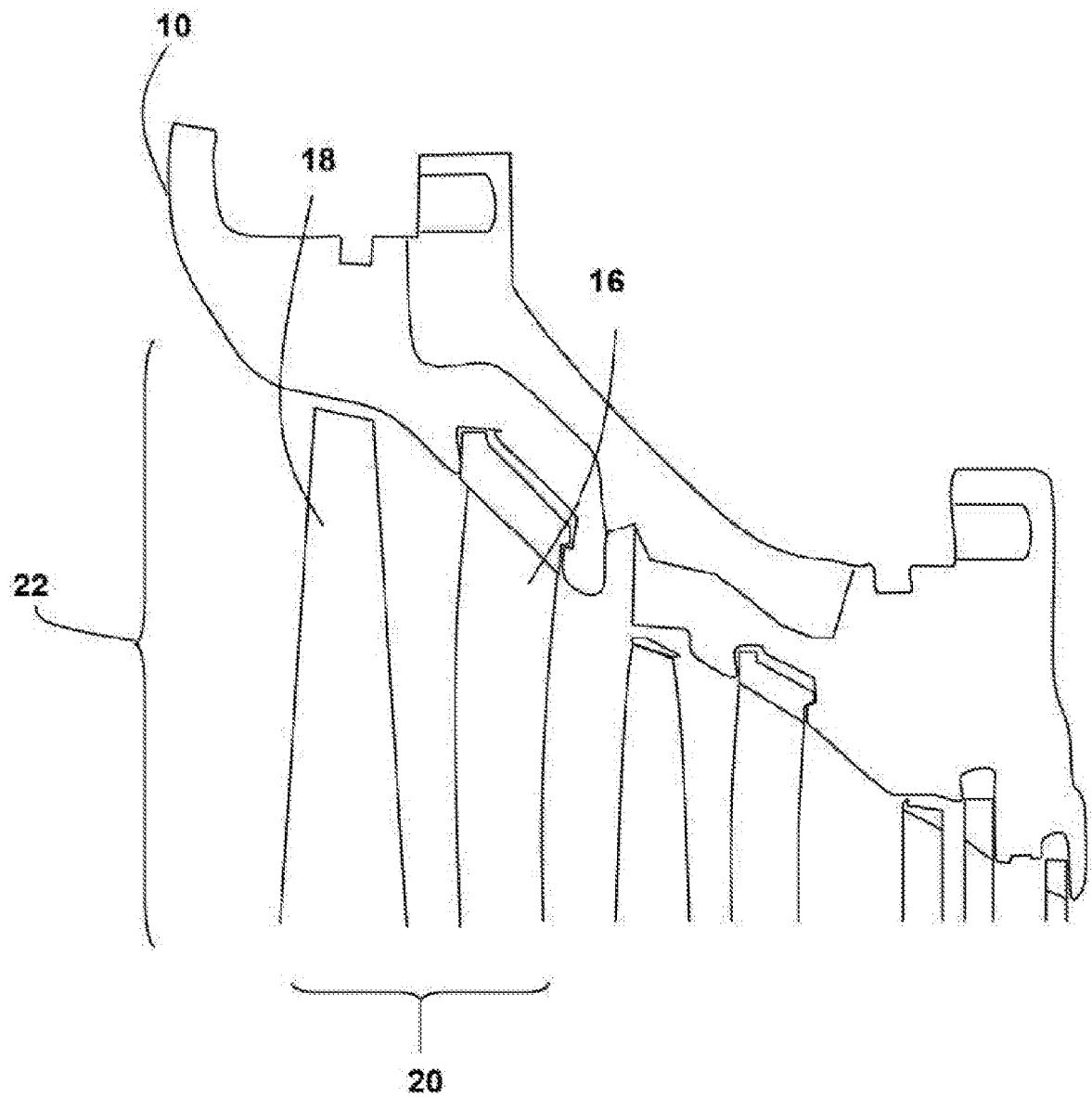
FIG. 1 illustrates a sectional view of a portion of a steam turbine to which an exemplary aspect of the disclosure may be applied.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details and is not limited to the exemplary embodiments disclosed herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

FIG. 1 illustrates a section of an axial flow steam turbine to which exemplary embodiments may be applied. Shown is a casing component 10, a steam flow path 22 and a last stage 20 comprising a stationary vane row 16 and a downstream rotating blade row 18.

The casing component 10 forms a radial outer limit of the axial steam flow path 22, thereby in part defining the axial steam flow path 22. The casing component 10 may additionally provide a carrier means for carrying one or more stationary vane rows 16. The casing component 10 may form only a portion of the casing of the steam turbine. That is, the casing component 10 is one component of several components. Alternatively, the casing component 10 may define the casing of the steam turbine.

As shown in FIG. 1, contained within the axial steam flow path 22 are stationary vane rows 16 that are each followed downstream, that is an axial direction corresponding to the nominal flow direction or working fluid through the flow path 22, by rotating blade rows 18. The last vane row 16/blade row 18 combination contained within the flow path 22 defines the last stage 20 of the turbine.

Figure 2:
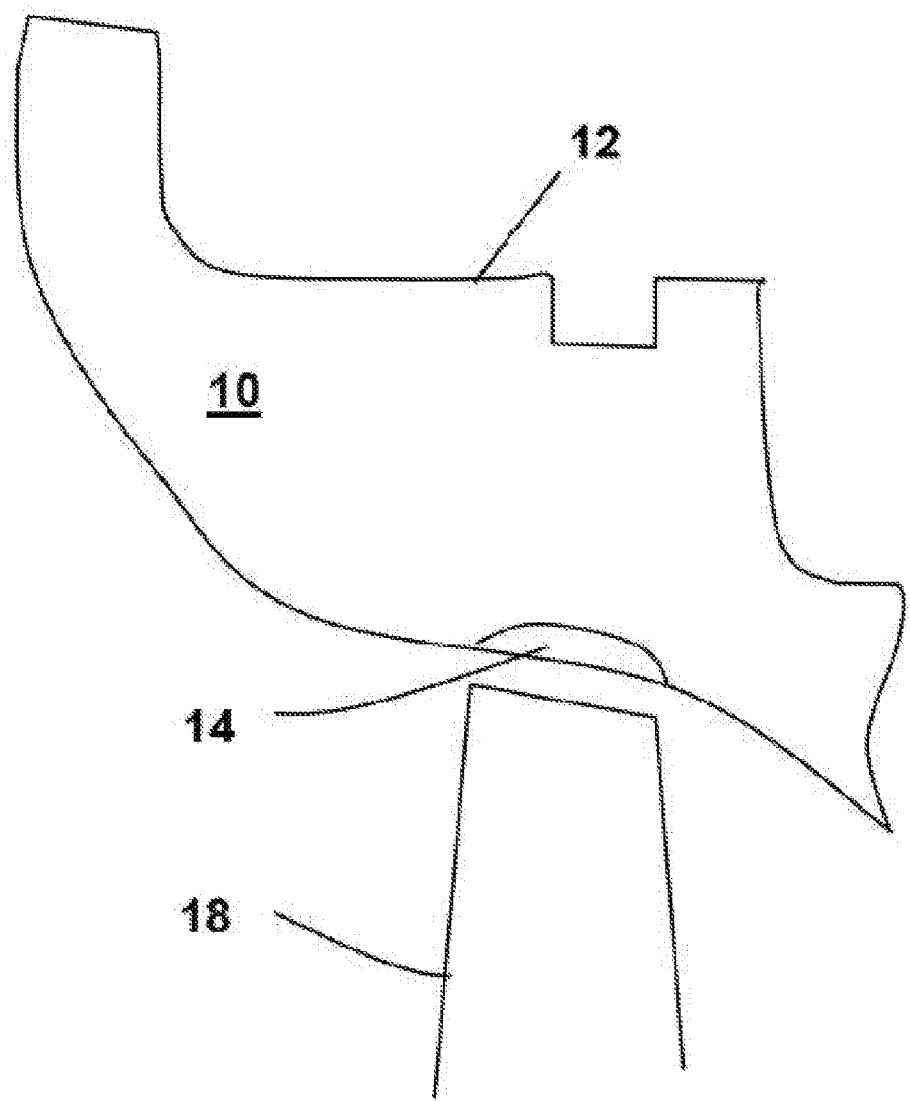
FIG. 2 illustrates an expanded view of a section of FIG. 1 showing a repaired region of an exemplary aspect.

In an exemplary embodiment shown in FIG. 2, the casing component 10 comprises a base 12 made of nodular cast iron (or ductile iron) and a repaired region 14 that is located the base 12 in a region exposed to the steam flow path 22. The repaired region 14 consists of a butter layer underlying a filler or fill layer. In an exemplary embodiment the repaired region 14 is located in a region radially between the rotating blade row 18 and the base 12, wherein the radial direction is defined at the direction perpendicular to the rotational axis of the rotating blade row 18. However, the repaired region 14 may be located anywhere in or on casing 10.

Figure 3:
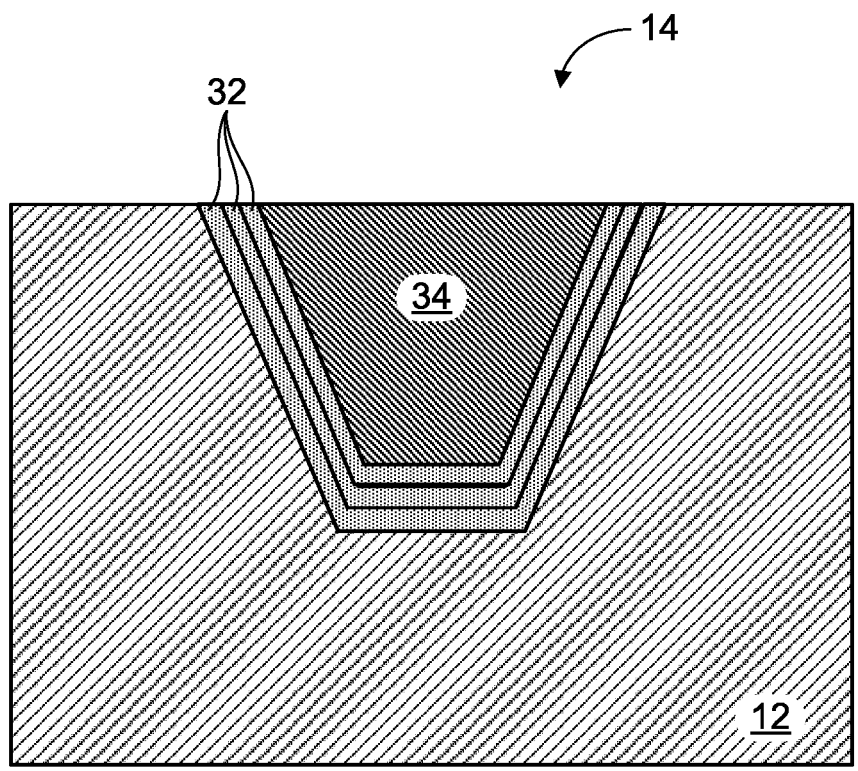
FIG. 3 illustrates a sectional view of a repaired region that includes one or more butter layers and a fill layer, according to an exemplary aspect.

FIG. 3 illustrates a sectional view of a repaired region 14 that includes one or more butter layers 32 and a fill layer 34, according to an aspect of the present disclosure. The substrate or base 12 is comprised of nodular cast iron, which may also be referred to as ductile iron, ductile cast iron, spheroidal graphite iron, or spheroidal graphite cast iron. In ductile or nodule cast irons, graphite is in the form of spheres or nodules rather than flakes as in grey iron. In grey iron, sharp graphite flakes create stress concentration points within the metal matrix. In contrast, the rounded or spherical nodules in nodular cast iron inhibit the creation of cracks, providing enhanced ductility and superior mechanical properties. Prior to repair, region 14 may take the form of a cavity or recess, and this recess may be further excavated to provide a stable base on which to build the repair. The substrate or component may then be subjected to an optional pre-heating step, where the substrate is heated to a maximum of 204° C. (400° F.). This optional heating step is to facilitate the removal of undesired moisture levels.

After a satisfactory base shape is obtained two or more butter or buttering layers 32 are applied to base 12. Each butter layer 32 may be comprised of nickel, a nickel alloy, a nickel iron alloy or a nickel iron manganese alloy. The butter layers 32 are relatively soft and do not form a brittle microstructure due to the large carbon pickup from the cast iron base 14. The butter layers 32 are preferably applied with low heat input, an interpass temperature less than 204° C. (400° F.) and low to no preheat. Interpass temperature is the temperature of the weld site at which subsequent weld runs are deposited, and a specific maximum interpass temperature is selected to control weld metal microstructural development and to minimize the risk of solidification or liquation cracking for austenitic nickel and nickel alloys. A welder must wait for the weld site to cool before making another pass, if the local temperature is above the desired interpass temperature.

A fill layer 34 is applied on the butter layers 32. The fill layer 34 may be comprised of 1 or more layers of low carbon steel. A low carbon steel material or welding electrode is one in which the carbon content does not exceed about 0.25% and the manganese content does not exceed about 1.65%. The carbon steel material has a similar mean coefficient of thermal expansion as the nodular cast iron ensuring that the welded region will expand and contract at the approximately same rate as base material during thermal cycles of the casing. The fill layer 34 may be applied in one or multiple passes until a desired profile is obtained. An advantage to using the fill layer 34 is that it may deposited with a higher rate than the butter layers 32 and with higher interpass temperature, up to 400° C. (750° F.).

The butter layers 32 may be deposited by using a welding electrode or welding wire. One example of a material composition (by weight) for a welding/buttering electrode is iron (Fe) balance, nickel (Ni) about 56.8%, carbon (C) about 1.18%, silicon (Si) about 0.49% and manganese (Mn) about 0.49%. Mechanical properties of a resulting weld metal are a tensile strength of about 480 N/mm$^2$ or 70 ksi, elongation of about 18% and a hardness of about 170 to 190 HV or 85-90 HRB. Additional examples of welding/buttering electrode material compositions are: Ni balance, Fe 0.80% to 5.3%, C 0.43% to 1.2%, manganese 0.25% to 2.5%, Si 0.32% to 0.70%. Furthermore, a nickel or nickel alloy welding/buttering electrode may also be employed in specific applications for the butter layers 32. A suitable Ni alloy has a composition of at least 85% Ni, a Ni—Fe alloy has 45%-75% Ni with the balance Fe, and a Ni—Fe—Mn alloy has a minimum of 35% Ni, 10% to 15% Mn, and the balance Fe. The nickel alloys may have trace or small amounts of C, Si, Mn, Cu, Al and up to 3% strong carbide forming elements.

Figure 4:
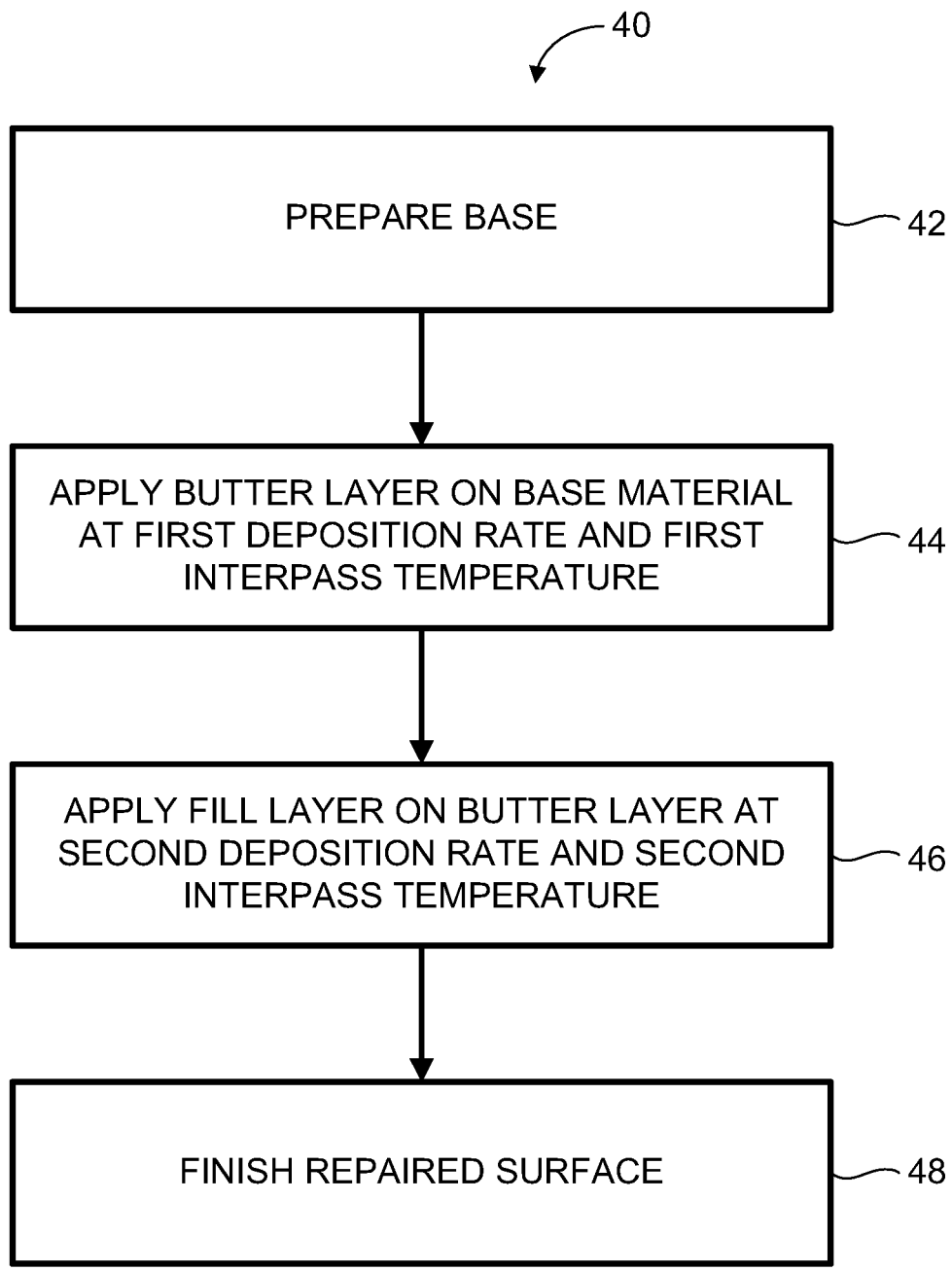
FIG. 4 illustrates a flowchart for a method for repairing a casing component that forms part of a flow path in a steam or gas turbine.

FIG. 4 illustrates a flowchart for a method 40 for repairing a casing component that forms part of a flow path in a turbine. The turbine may be a gas turbine or a steam turbine. The method includes a preparing step 42 that prepares the base material. The base material 10 is ductile cast iron or nodular cast iron. The preparing step 42 may include identifying a region needing to be repaired or serviced, excavating this region and cleaning the region. Excavating may entail removing loose base material or profiling the shape of the region to a desired shape for subsequent repair/service. After the base material is prepared, an applying step 44 applies one or more butter layers 32 to the base material 10. The butter layer(s) 32 are applied on the base material 10 with a first preheat temperature and a first interpass temperature. The first preheat temperature may be from about room or ambient temperature up to 204° C. (400° F.). The interpass temperature ranges from ambient to 204° C. (400° F.).

A second applying step 46 applies one or more fill layers 34 on the butter layer 32. The fill layer 34 is applied with a second interpass temperature that ranges between ambient to 400° C. (750° F.). The first heat input level may be lower than the second heat input level. The fill layer 34 may also be applied at a second deposition rate which is higher than the first deposition rate. A finishing step 48 may be used to machine or polish the surface of the repaired area to a desired shape profile or surface roughness.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A casing component configured to form part of a flow path in a turbine, the casing component comprising:
   a base made of nodular cast iron; and
   a repaired region in the base, the repaired region comprised of a butter layer applied on the base and a fill layer applied on the butter layer.

2. The casing component of claim 1, wherein the butter layer is comprised of a nickel alloy, a nickel-iron alloy or a nickel-iron-manganese alloy.

3. The casing component of claim 1, wherein the fill layer is comprised of carbon steel.

4. The casing component of claim 1, wherein the turbine is a gas turbine or a steam turbine.

5. A method for repairing a casing component that forms part of a flow path in a turbine, the method comprising:
   applying a butter layer on a base material, the butter layer applied with a first interpass temperature;
   applying a fill layer on the butter layer, the fill layer applied with a second interpass temperature; and
   wherein the first interpass temperature is lower than the second interpass temperature.

6. The method of claim 5, wherein the butter layer is comprised of a nickel alloy, a nickel-iron alloy, or a nickel-iron-manganese alloy.

7. The method of claim 5, wherein the fill layer is comprised of carbon steel or low carbon steel.

8. The method of claim 5, wherein the base material is comprised of cast iron or nodular cast iron.

9. The method of claim 5, wherein the applying the butter layer step comprises applying multiple butter layers.

10. The method of claim 5, wherein the first interpass temperature is between ambient to about 204° C. (400° F.).

11. The method of claim 5, wherein the second interpass temperature is between ambient to about 400° C. (750° F.).

* * * * *